UNITED STATES PATENT OFFICE.

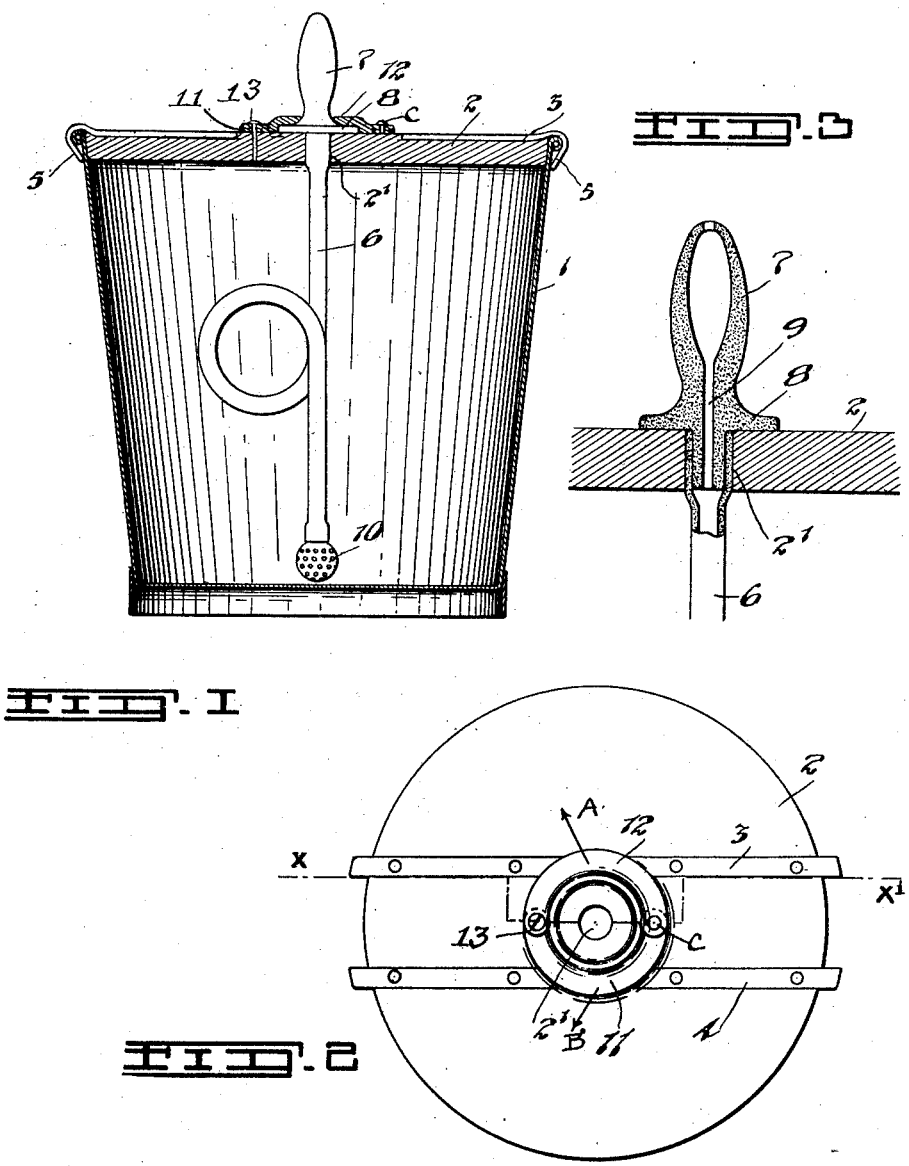

JOHN MOORE, OF WINNIPEG, MANITOBA, CANADA.

CALF-FEEDER.

1,002,426. Specification of Letters Patent. Patented Sept. 5, 1911.

Application filed June 2, 1910. Serial No. 564,664.

*To all whom it may concern:*

Be it known that I, JOHN MOORE, of the city of Winnipeg, in the Province of Manitoba, Canada, have invented certain new and useful Improvements in Calf-Feeders, of which the following is the specification.

My invention relates to calf feeders and the object of the invention is to provide an inexpensive and durable feeder by which milk or other such liquid can be fed to the animal in proper quantities thereby preventing the animal from choking and producing a healthy condition.

It consists essentially in a pail having a suitable cover, cross bars secured to the top and extending downwardly to the sides of the pail, a nipple carried by the cover, a tube passing from the nipple to the interior of the pail, a strainer secured to the end of the tube and means for releasably securing the nipple to the cover, the parts being arranged and constructed as hereinafter more particularly described.

The invention is illustrated in the accompanying drawings, in which:—

Figure 1 is a vertical section view through a pail provided with my invention, section being taken in the plane denoted by the line X X', Fig. 2, certain parts being shown in a side elevation. Fig. 2 is a plan view of my invention. Fig. 3 is an enlarged detailed sectional view through the nipple tubing and cover.

In the drawings like characters of reference indicate corresponding parts in each figure.

1 represents a liquid retaining receptacle such as a milk pail in which is tightly inserted a wooden cover or top 2 the cover carrying cross bars 3 and 4 counter-sunk therein and having their ends extending downwardly against the sides of the pail at 5.

6 is a flexible rubber tube secured to a rubber nipple 7, the nipple having a solid flaring base 8 and central duct 9 opening into the tube. A sieve 10 is secured to the lower end of the tube and the whole is attached to the pail by passing the flexible tube upwardly through an opening 2' formed in the cover and then securing the nipple to the open end of the tube. The base of the nipple rests on the upper face of the cover and is held from passing upwardly by two swingable clamping plates 11 and 12 pivotally secured to the cover at 13. The plates are constructed so that they will close over the base of the nipple and hold it tightly to the upper face of the cover.

When it is desired to clean the parts it is only necessary to swing the plates in the directions indicated by the arrows A and B clear of the nipple base, draw the tube upwardly by grasping the nipple and then remove the nipple. The tube can then be withdrawn free of the cover. The plates are held in position by friction between their contacting faces, but, if necessary, a short pin C may be used to hold them in place.

I have found in practice that it is desirable to tie a loose knot in the tube in order to make the feeding slower.

What I claim as my invention is:

1. A feeder comprising a pail, a tight fitting cover for the pail, a flexible tubing passing centrally through the cover and into the pail, a nipple secured to the tubing, said nipple having an enlarged base and clamping plates releasably securing the nipple to the cover, as and for the purpose specified.

2. A feeder comprising a pail, a cover fitting the pail tightly, cross bars countersunk in the cover and with their ends turned downwardly against the sides of the pail, a flexible tubing passing centrally through the cover and into the pail, a sieve at the lower end of the tubing, a nipple secured to the upper end of the tubing and having an enlarged base piece resting on the cover and opposing clamping plates swingably secured to the cover and designed to pass over the base of the nipple, as and for the purpose specified.

Signed at Winnipeg, in the Province of Manitoba, this 16th day of April, 1910.

JOHN MOORE.

Witnesses:
G. S. ROXBURGH,
J. K. ELKIN.

Copies of this patent may be obtained for five cents each, by addressing the "Commissioner of Patents, Washington, D. C."